(12) United States Patent
Stafford (10) Patent No.: US 12,468,156 B2
(45) Date of Patent: Nov. 11, 2025

(54) SYSTEM TO DETECT ADD-ON PRESCRIPTION LENSES TO VR HMDS WITH EYE TRACKING

(71) Applicant: Sony Interactive Entertainment Inc., Tokyo (JP)

(72) Inventor: Jeff Stafford, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 107 days.

(21) Appl. No.: 18/178,503

(22) Filed: Mar. 4, 2023

(65) Prior Publication Data

US 2024/0295735 A1    Sep. 5, 2024

(51) Int. Cl.
*G02B 27/01*  (2006.01)
*G02C 7/02*   (2006.01)
*G06F 3/01*   (2006.01)

(52) U.S. Cl.
CPC ......... *G02B 27/0172* (2013.01); *G02C 7/027* (2013.01); *G06F 3/013* (2013.01)

(58) Field of Classification Search
None
See application file for complete search history.

(56) References Cited

U.S. PATENT DOCUMENTS

| | | | |
|---|---|---|---|
| 11,269,406 B1* | 3/2022 | Sztuk | G06F 3/011 |
| 2018/0180893 A1 | 6/2018 | Gupta | |
| 2023/0004008 A1 | 1/2023 | Samec et al. | |
| 2023/0309821 A1* | 10/2023 | Aferzon | A61B 3/10 |
| | | | 351/159.01 |

OTHER PUBLICATIONS

"Eyeglass Prescription Explained", Perfect Eyeglasses Guide, retrieved from https://www.perfect-eyeglasses-guide.com/eyeglass-prescription.html.
Hwang, Alex D, and Eli Peli. "Stereoscopic 3D Optic Flow Distortions Caused by Mismatches between Image Acquisition and Display Parameters." The Journal of imaging science and technology vol. 63,6 (2019): 604121-604127. doi:10.2352/j.imagingsci.technol.2019.63.6.060412.
"International Search Report and Written Opinion", dated May 17, 2024, from teh counterpart PCT application PCT/US24/11336.
Ramsden, "Using stem cells to model lvlERTK deficient retinitis pigmentosa", University College, London, Oct. 31, 2016, Retrieved from the internet entire document.

* cited by examiner

*Primary Examiner* — Nicholas J Lee
(74) *Attorney, Agent, or Firm* — Kilpatrick Townsend & Stockton LLP (57) ABSTRACT

A person's prescription lens holder that is configured to fit on an HMD is configured for modifying eye tracking glint reflections to detect the presence of the prescription lens holder and thus alert the playback system that a prescription lens is in use and may distort the projected video, requiring correction. In addition or alternatively, a computer readable code may be disposed on the holder for facilitating look up of the prescription parameters to enable correction of the video presentation to account for the prescription lens.

19 Claims, 9 Drawing Sheets

SYSTEM TO DETECT ADD-ON PRESCRIPTION LENSES TO VR HMDS WITH EYE TRACKING

FIELD

The present application relates generally to systems to detect add-on prescription lenses (prescription lens inserts) to extended reality (such as virtual reality (VR)) head-mounted displays (HMDs) with eye tracking.

BACKGROUND

People wear extended reality (XR) headsets such as VR HMDs to play computer simulations such as video games. An example is Virtual Reality (VR) Head Mounted Display (HMD) systems which are designed to deliver an optically correct view of a virtual scene (virtual world, game, spatial movie, etc.) as much as possible. VR HMD systems typically ensure the field of view (FOV) displayed through the VR HMD lenses matches what a user should expect to see, as if they were not viewing through a VR HMD system. The goal of the VR HMD visual system (head tracking, virtual image rendering, displays and optics) is to replicate reality as closely as possible.

SUMMARY

As understood herein, a significant number of people require some form of prescribed vision correction, mostly with prescription eyeglasses. These vision correction eyeglasses correct such things as myopia (nearsighted), hyperopia (farsighted), and presbyopia (farsighted and near-sighted). As further understood herein, there is a desire to decrease the bulk (form factor) and weight of VR HMDs in an effort to increase comfort and convenience, but this reduces the space available to accommodate the user's eyeglasses.

Accordingly, an apparatus includes at least one processor configured to receive signals from at least one light sensor in a head-mounted device (HMD) representing glints reflected from an eye of a person wearing the HMD. The processor is configured to, based at least in part on the signals, output an indication that a prescription lens holder (prescription lens insert) is disposed on the HMD.

In some examples the processor is configured to output the indication based at least in part on an absence of at least one glint. In other examples the processor is configured to output the indication based at least in part on a modification of at least one glint from a baseline appearance. The modification can include one or more of a shape that is different from a shape of the baseline appearance, a size that is different from a size of the baseline appearance, or a pattern that can represent a computer readable code.

The indication can include presenting a user interface (UI) to prompt entry of a user's prescription information. In addition, the indication can include providing prescription information obtained from the signals to a display engine to alter presentation of video on the HMD according to the prescription information.

In another aspect, an apparatus includes at least one prescription lens, and at least one prescription lens holder with an inner periphery for holding the lens and, extending from the inner periphery, a lip configured to engage the exterior of a lens of a head mounted display (HMD). If desired the holder is configured to hold a single prescription lens, and two independent holders, one for the left eye and one for the right eye, can be independently attached to the HMD in optical series with respective HMD lenses.

In some embodiments the holder includes plural holes for allowing light from respective light sources to pass through the holder to an eye of a wearer of the HMD. In a specific implementation, the HMD includes N eye tracking light sources and the plural holes number N−1, i.e., the holder blocks light from one of the light sources. In other implementations the HMD includes N eye tracking light sources and the plural holes number N, with at least a first one of the plural holes being sized and/or shaped differently than at least a second one of the plural holes. In addition or alternatively, an object can be disposed in at least one of the plural holes and configured to modify the light source to produce a machine readable code. Or, the holder can include at least one substrate with the ability to modify the light source for at least one machine readable code. It should be understood that the above examples are not limited to the manipulation of just one eye tracking light source, but could include various manipulations of many eye tracking light sources.

In another aspect, a method includes illuminating an interior of a head-mounted device (HMD) to cause at least one eye of a wearer of the HMD to reflect light as glints, and modifying at least one glint to detect a prescription lens insert attachment on the HMD.

In some examples the modifying includes blocking light from at least one light source using the insert. In other examples the modifying includes altering light from at least one light source using at least one optical device in the insert.

If desired, the method may include detecting a user identification code (UIC) based on a physical setting on the prescription lens insert, using the UIC for identifying at least one prescription parameter, and using the prescription parameter for changing at least one virtual reality rendering and/or optical distortion correction in the HMD.

Example embodiments may include detecting a computer readable code on the insert that represents at least one prescription parameter, with the computer readable code being on a substrate of the underside of the insert frame.

The details of the present application, both as to its structure and operation, can be best understood in reference to the accompanying drawings, in which like reference numerals refer to like parts, and in which:

DETAILED DESCRIPTION

Following up the discussion above related to smaller form factor HMDs, it desirable for the HMDs to include a user's vision correction into the system (incorporation of the effect of the user's eyeglasses). As set forth herein, prescription lenses can be directly attached to the HMD lenses. Such prescription lens inserts allow a user who requires vision correction to view through an HMD correctly, as the vision correction prescription lenses are now attached to the HMD. The user no longer needs to wear eyeglasses in addition to the HMD and can just wear the small form factor HMD by itself.

However, it is desirable that the HMD be aware that the user is employing vision correcting devices because the presence of the additional prescription lens optics causes geometric distortions to the viewed virtual image. Depending on the user's vision correction prescription, the user's perception of the virtual image otherwise would be distorted. The distortions include field of view (FOV) mismatch and pupil swim, which can cause discomfort.

Also, the rendering of the virtual image to an HMD display for displaying through wide field of view (FOV) HMD optics typically is modified to account for the optical distortion caused by the HMD optics. This optical pre-distortion correction is performed before any images are displayed in the HMD. Again, it is desirable that the HMD be aware of the presence of the prescription lens inserts and therefore corrects for any additional distortions caused by them.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single-or multi-chip processor that can execute logic by means of various lines such as address lines, data lines, and control lines and registers and shift registers. A processor including a digital signal processor (DSP) may be an embodiment of circuitry.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Figure 1:
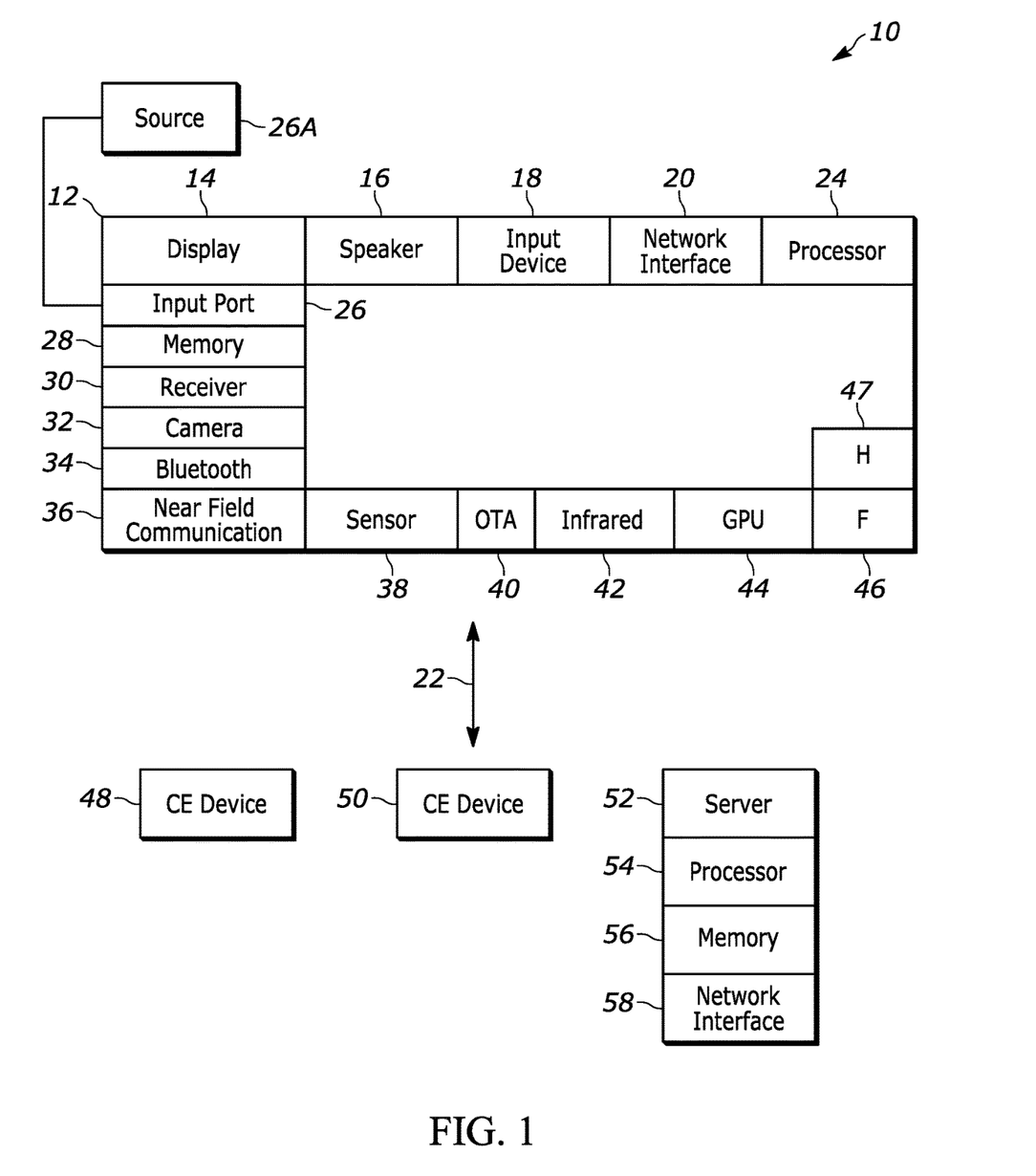
FIG. 1 is a block diagram of an example system in accordance with present principles.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
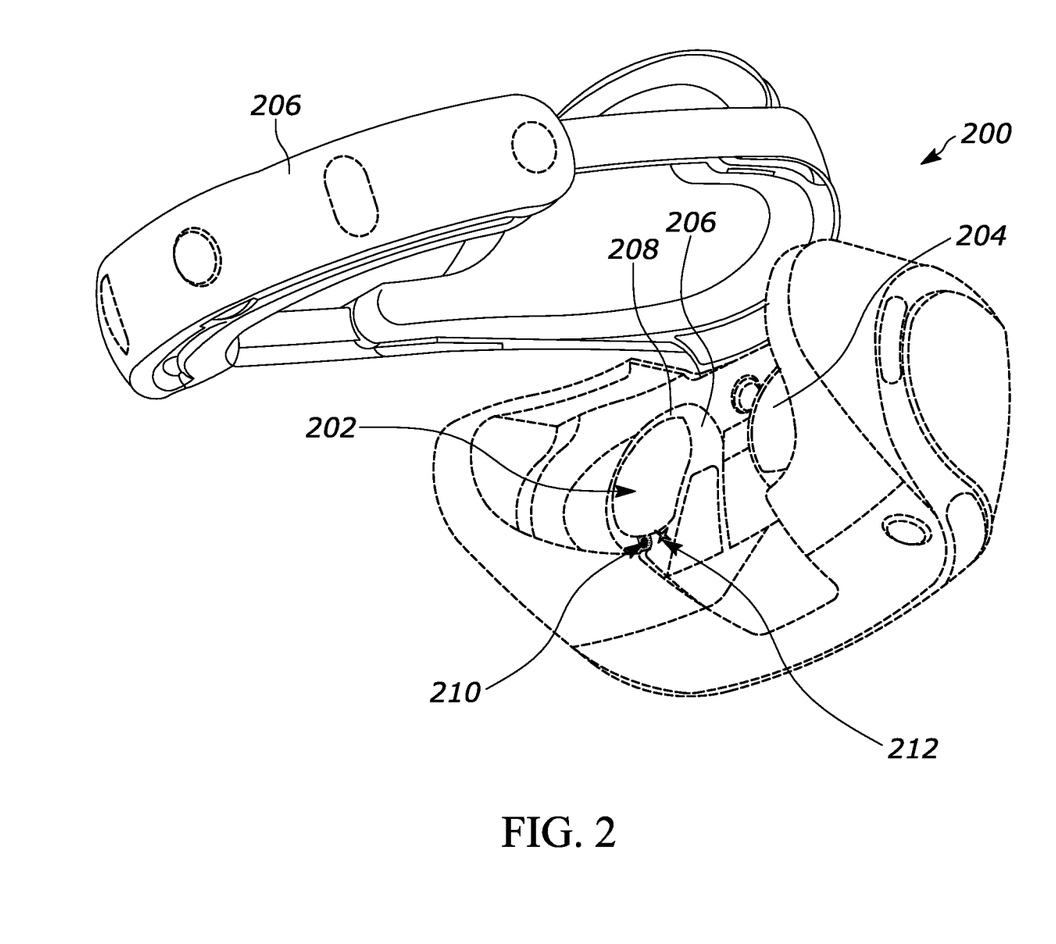
FIG. 2 illustrates an example head-mounted device (HMD)

Now in reference to FIG. 2, a HMD 200 is shown with left and right HMD lenses 202, 204 mounted between a display and the eyes of a wearer of a headband 206 of the HMD 200. In an example, the left HMD lens 202 may be circumscribed by a ring 206 with an upper surface 208. The right HMD lens 204 may be similarly supported. The HMD 200 may be an extended reality HMD such as a virtual reality (VR) HMD or augmented reality (AR) HMD.

One or more imagers 210 such as a complementary metal oxide semiconductor (CMOS) may be disposed on the HMD 200 for purposes to be shortly disclosed. Additional imagers may be provided. Also, one or more light sources 212 such as an infrared (IR) light emitting diode (LED) may be provided.

Figure 3:
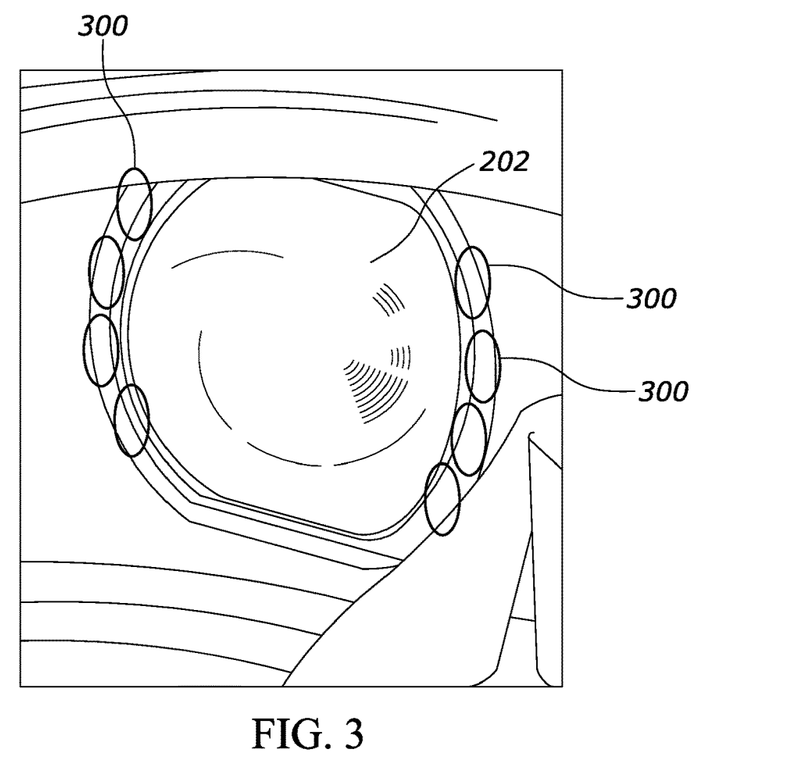
FIG. 3 illustrates the left eye optics and eye tracking LED emitters highlighted for an example VR HMD.

FIG. 3 illustrates that in addition to the structures shown in FIG. 2, the HMD 200 may include plural eye tracking light sources 300, in the example shown, eight IR LED emitters 300 arranged around the periphery of the left HMD lens 202, it being understood that similar structure may be provided for the right HMD lens. The eye tracking light sources illuminate the eye (in the example shown, the left eye) of the user to produce reflections of light from the eye, referred to as "glints", which are recognized using machine vision from the detection signals of one or more light detectors in the HMD and used to determine the pose of the eye (direction if gaze, primarily). Eye tracking in turn is used by the HMD and/or game engine in presenting a computer simulation such as a video game on the HMD.

With the above in mind, as contemplated herein, in addition to the HMD lenses 202, 204 shown in FIGS. 2 and 3, which are part of the HMD as vended, a user may wish to install their own prescription lenses in the HMD in optical series with the HMD lenses. Accordingly, FIGS. 4-8 are now referred to.

Figure 4:
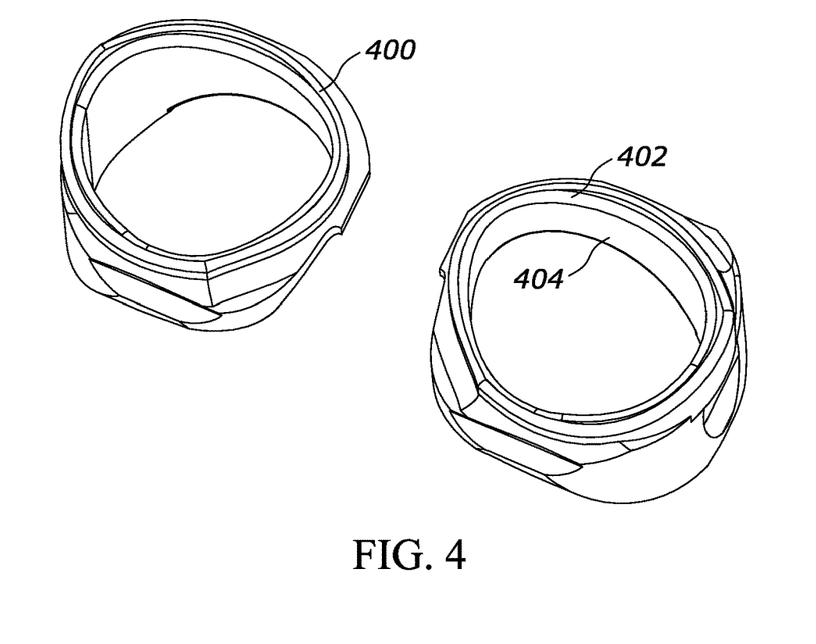
FIGS. 4-8 illustrate various prescription lens holders configured to be added onto an HMD such as the HMD of FIG. 2.

In FIG. 4, left and right prescription lens holders 400 are provided. Each holder defines an inner periphery 402 for holding a prescription lens within the holder (prescription lenses not shown in FIGS. 4-8). Extending from the inner periphery 402 typically generally perpendicular to the optical axis defined by the inner periphery 402 may be a lip 404 that is configured to engage the upper surface 208 of the ring 206 of an HMD lens to thereby engage the prescription lens holder 400 with a respective one of the HMD lenses of the HMD 200. In this way, a user can attach their personalized prescription lenses onto the HMD 200 to aid in viewing computer simulations.

Figure 5:
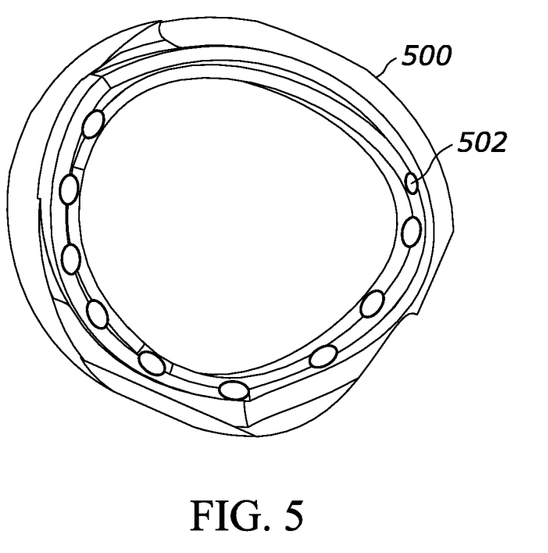
Figure 6:
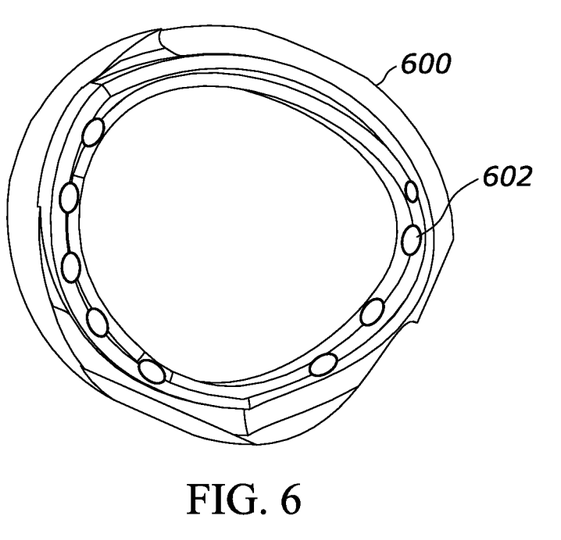

FIG. 5 illustrates a prescription lens holder 500 that can be formed with plural holes 502 that, when the lens holder 500 is properly added onto the HMD, are aligned with respective eye tracking light sources 300, to permit eye tracking light to pass through the holder to the user's eye to form the above-described glints. FIG. 6 illustrates a lens holder 600 in which one of the holes in the holder 500 of FIG. 5 is omitted, in the example shown, the bottom hole, i.e., in cases in which the HMD has N eye tracking light sources 300, the plural holes 602 in FIG. 6 number N−1.

Accordingly, it may now be appreciated that signals from at least one of the light sensors of the HMD can be received that represent glints reflected from an eye of a person wearing the HMD, and then based on the signals, an indication can be output that a prescription lens holder is disposed in the HMD. In the case of FIG. 6, the indication is output based on an absence of at least one glint.

Figure 7:
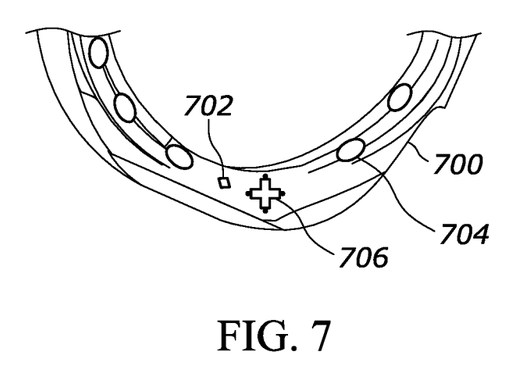

In contrast, FIG. 7 illustrates a prescription lens holder 700 that in all essential respects is identical in configuration and operation to those described elsewhere herein except that it has one hole 702 with a different size (in the example shown, smaller) and/or shape (in the example shown, square) than a baseline shape and size of other holes 704 (which are elliptical and larger as shown). In this case, the indication that the prescription lens holder is present is based on a modification of at least one glint from a baseline appearance. Note that the holder 700 includes as many holes (N) as eye tracking light sources (N), with each hole of the holder being aligned with a respective eye tracking light source.

FIG. 7 furthermore illustrates a mechanical selector 706 that may be present on any of the holders described herein. In the example shown, the selector 706 is a four stage or four pole switch that can be manually moved to one of four positions to indicate which one of up to four users is about to don the HMD. Depending on the position of the operator, a code is generated signaling a specific user identification with a specific set of vision correction specifications (prescription parameters). The prescription parameters can have previously been entered into the HMD system via a UI such as the one described below. Such a system supports multiple users, with differing vision correcting needs and different sets of prescription inserts.

In such a multiuser prescription id system, the multi-level code is generated by a simple sliding plastic mechanism on the prescription lens insert frames. For example, as discussed above the operator 706 may be implemented by a plastic mechanism like a four-stage switch, that allows a user to slide a separate plastic lever on the prescription insert frames, into one or four positions from above on the outer surface of the prescription insert lens frame. On the underside of the movable plastic lever, facing the eye tracking light sources and one or more imagers described above, can be a reflective portion of the plastic. The reflective portion can selectively (based on the selected stage) reflect different amounts of IR light onto one or more photodiodes, thus reflecting one of four different light levels, which can be interpreted as one of four different codes correlated to respective different users.

Figure 8:
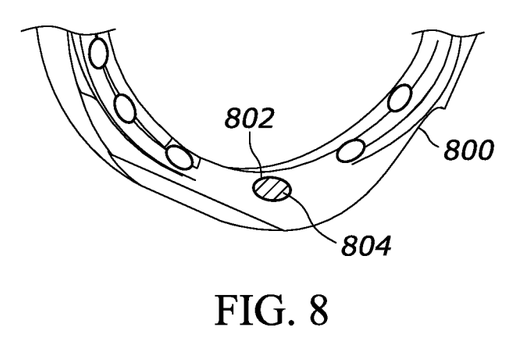

Yet again, FIG. 8 illustrates a prescription lens holder 800 that is substantially identical in configuration to the holder 500 shown in FIG. 5, except that one hole 802 is filled with a translucent or transparent member 804. The member 804 may be a lens that alters the path of light through the hole 802 to a location other than the location a glint would have passing through the hole unobstructed, and on that basis signal that a prescription lens is in place. Alternatively, the member 804 may include a computer readable code etched or printed or otherwise disposed on it so that light passing through the member 804 creates a glint with the code embedded in the glint. The code may be detected by machine vision and correlated to a user ID which can be used to enter a database to ascertain the related prescription parameters, or the code may itself indicate the prescription parameters directly.

Figure 9:
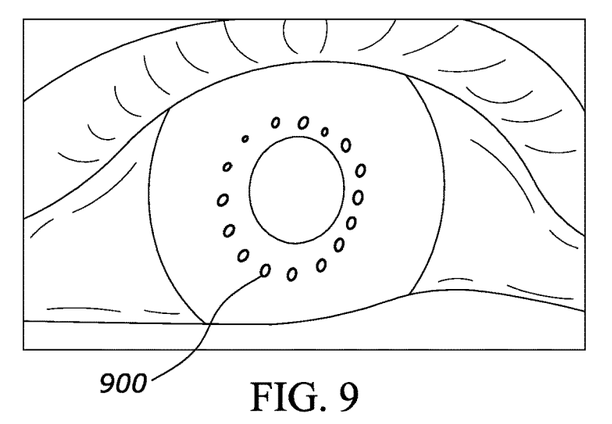
FIG. 9 illustrates a glint pattern on an eye within an HMD without prescription lens inserts in place.
Figure 10:
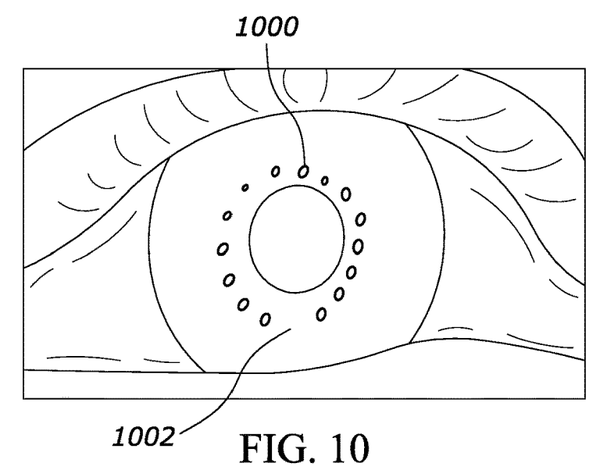
FIG. 10 illustrates a glint pattern on an eye within an HMD with a first example prescription lens insert in place.
Figure 11:
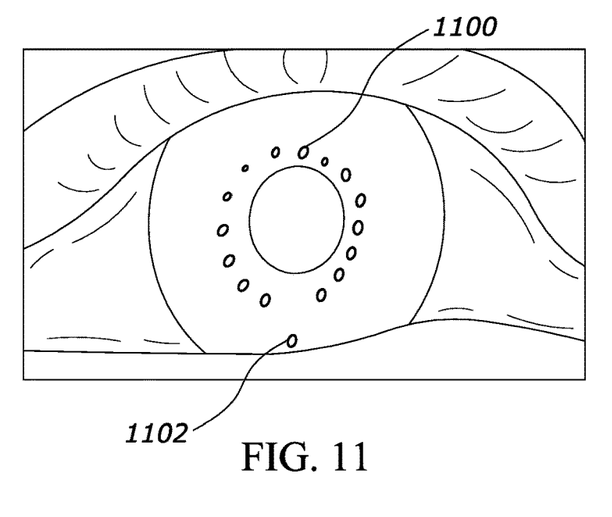
FIG. 11 illustrates a glint pattern on an eye within an HMD with a second example prescription lens insert in place.

FIGS. 9-11 illustrate the eye of a user wearing the HMD. In FIG. 9, no prescription lens holder (or equivalently, the lens holder 500 of FIG. 5) is attached onto the lenses of the HMD; as a consequence, "N" glints 900 are detected from "N" eye tracking light sources in a pattern that indicates no lens holder is present.

In FIG. 10, the prescription lens holder 600 of FIG. 6 is attached onto the lenses of the HMD; as a consequence, N−1 glints 1000 are detected, with no glint being detected at location 1002 where a glint otherwise would be expected, indicating the presence of the prescription lens holder 600 and that prescription lenses are attached to the HMD.

Yet again, in FIG. 11 "N" glints 1100 are detected from "N" eye tracking light sources but one glint 1102 is offset from the glint pattern, indicating that the prescription lens holder 800 of FIG. 8 with a lens in the hole 802 is attached.

Figure 12:
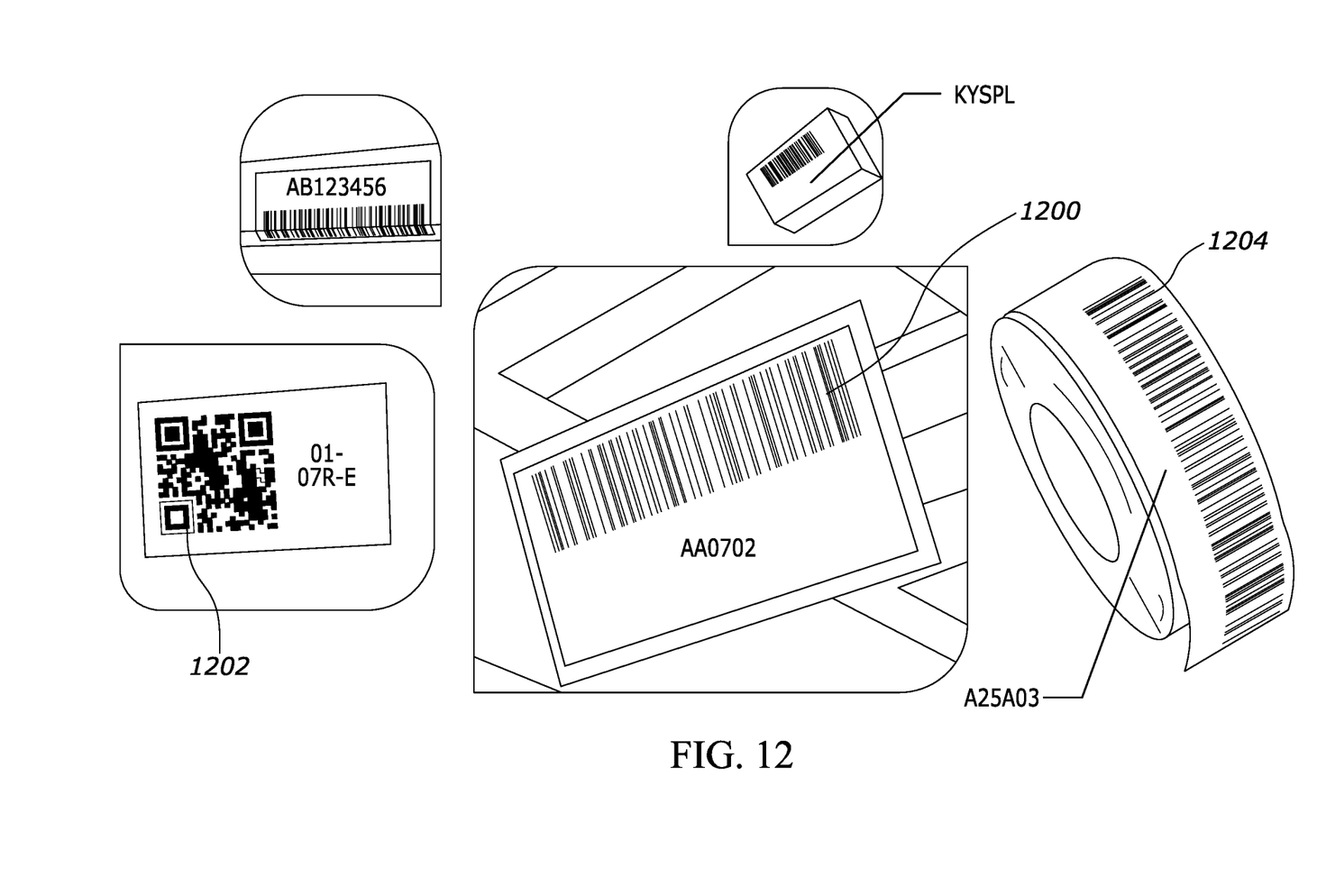
FIG. 12 illustrates plural labels with computer-readable codes that can be attached to the underside of prescription lens inserts that can be engaged with a HMD.

FIG. 12 illustrates various computer readable codes that may be used consistent with present principles, either on stickers that can be adhered to the underside of the frame of a prescription lens holder or inscribed or otherwise embedded on the member 804 in FIG. 8. A bar code 1200 may be used, or a quick response (QR) code 1202, or other code. In the non-limiting example of FIG. 12 the codes are printed on stickers 1204. The codes may be printed using a combination of reflective and non-reflective ink, such that code on the sticker is reflected when illuminated by mostly homogeneous light, as such as infrared light from LED 212 in FIG. 2.

Note that in imaging the codes, a very low-resolution pixelated sensor (e.g., the CMOS sensors in an optical mouse input device) can be used to receive a pattern of reflected IR light from one or more IR LEDs that is either fully or partially covered by a printed reflective marker on the underside of the prescription lens insert frame. In this example, a user's vision correction prescription for each eye can be encoded into a simple binary or grey scale pattern that is sensed by the very low-resolution sensor. The pattern reflected can encode just another identifier that can be used to look up a specific prescription online (from a common global database) or it can be a specific encoding of the vision correction parameters (SPH, CYL, AXS, etc.). For example, the spherical correction SPH from −8 Diopters (D) (extreme Myopia) to +8D (extreme Hyperopia/Presbyopia) in 0.25D increments requires 64 codes. Cylindrical correction via CYL and AXIS to correct for astigmatism could take another 64 codes each. 192 codes may be required to encode over 95% of vision correction parameters. An 8×8 pixel resolution CMOS sensor that can measure a 4-level gray scale 8×8 image, can thus provide 8×8×4 codes, easily encoding the vision correction parameters in an 8×8 reflective pattern. The reflective pattern can generate four levels of light reflection per pattern pixel, which four variations of pixel area coverage of the IR reflective material to provide the 4-level gray scale pixel on the sensor.

Figure 13:
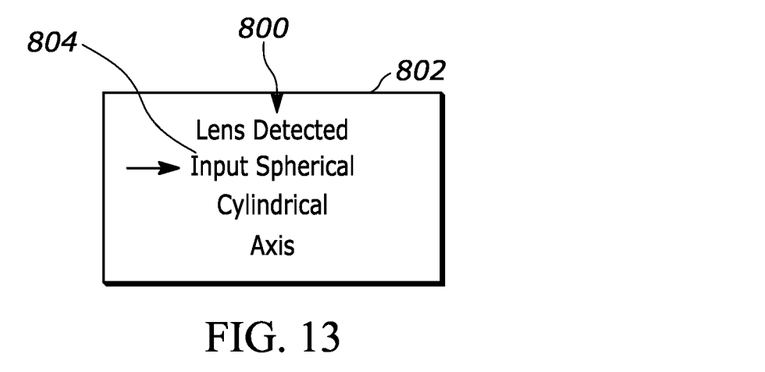
FIG. 13 illustrates an example user interface (UI) that may be presented responsive to detecting a prescription lens insert in place.

As mentioned above, when a prescription lens holder is detected as being attached to the HMD, an indication can be provided of such. FIG. 13 shows an example of such an indication, in which a user interface (UI) 1300 is presented on any display 1302 described herein (such as, but not limited to the display in the HMD itself) to prompt at 1304 for entry of prescription information. For example, the prompt for information may include a prompt, for each eye, spherical, cylindrical, and axis parameters of the user's prescription. Other parameters may be used. Typically, these values are prescribed to a user after their vision is tested by an Optometrist.

Figure 14:
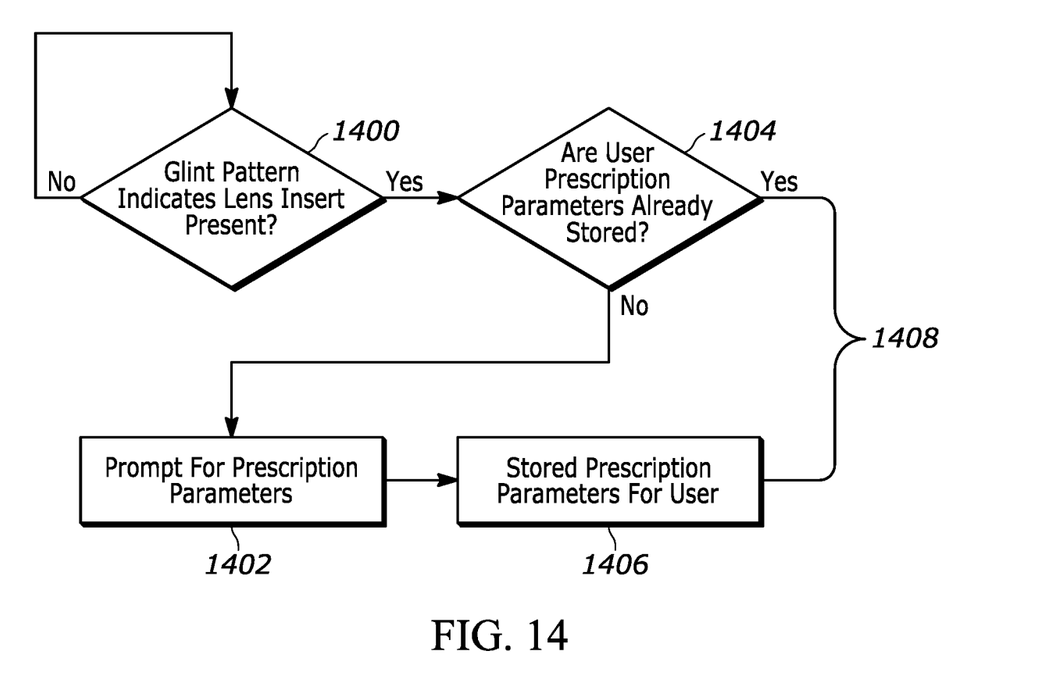
FIG. 14 illustrates example logic in example flow chart format.

FIG. 14 is related. If a processor such as any processor herein, including a processor in the HMD, detects at state 1400 that the glint pattern from the user's eye(s) indicates a prescription lens holder is present, the logic may move to state 1404 to check if a user's prescription is already stored in the system, then the logic may move to state 1402 to prompt for entry of the prescription (or user ID, which can then be correlated to a prescription using an online user-prescription correlation database), then the logic moves to state 1406 where the user's prescription information is stored in the system. Finally, the logic moves to state 1408, where a user's prescription information is utilized.

Figure 15:
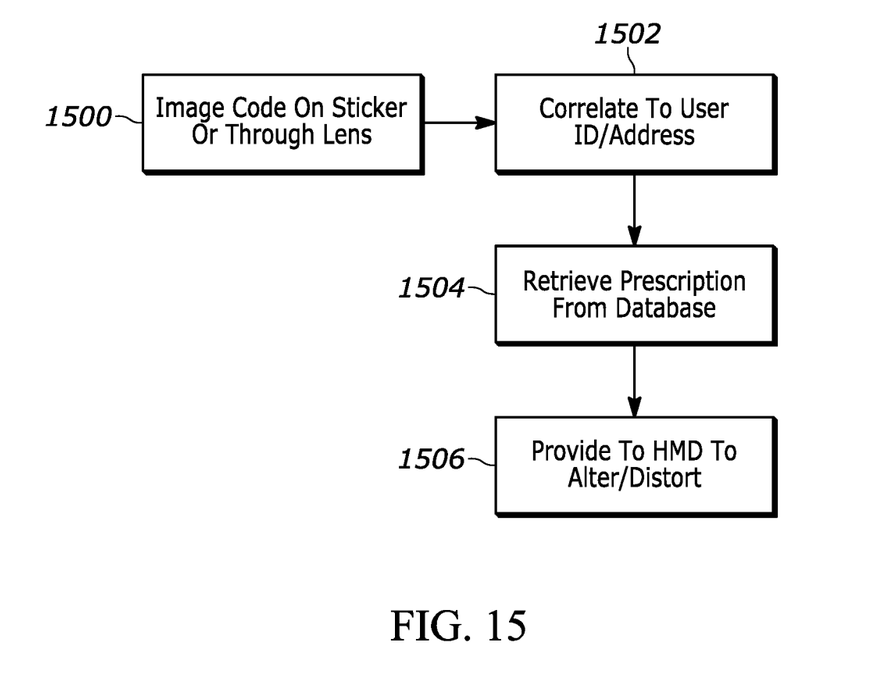
FIG. 15 illustrates additional example logic in example flow chart format.
Figure 16:
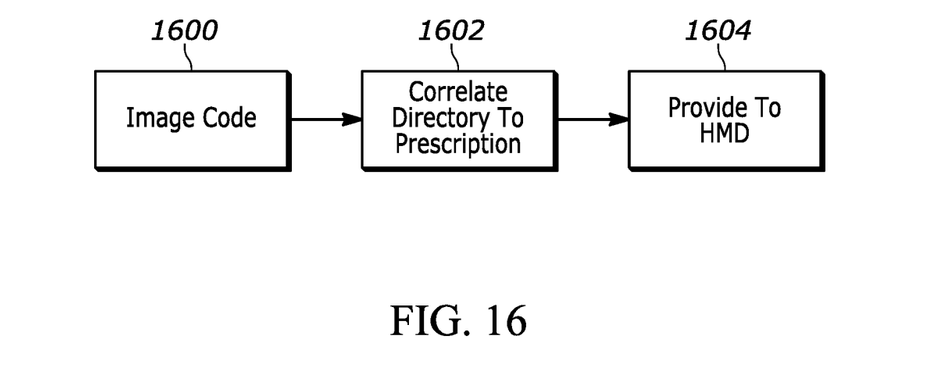
FIG. 16 illustrates still further example logic in example flow chart format.

FIGS. 15 and 16 illustrate alternative modes of providing an indication of when a prescription lens holder is detected as being attached to the HMD. In FIG. 15, a computer readable code is imaged either through the member 804 in FIG. 8 or on one of the stickers 1204 in FIG. 12 that is adhered to the underside of the frame of the prescription lens insert. Any of the imagers described herein may be used for this purpose. Proceeding to block 1502 the code is correlated to a user ID and/or a computer network address and using the user ID and/or network address, prescription parameters for the user are retrieved at block 1504. Block 1506 indicates that the indication of prescription lens attachment can include providing the prescription information obtained using the code to a display engine to alter presentation of video within the HMD according to the prescription information.

FIG. 16 illustrates a somewhat more direct approach, in which a code is imaged at block 1600 as described above and correlated directly to prescription information at block 1602. Block 1604 indicates that the prescription information obtained directly from the code is provided to a display engine to alter presentation of video within the HMD according to the prescription information.

As described above, one or more additional light sensors (photodiodes) can be added within the frame of the HMD lenses to measure the reflected light from IR emitting LEDs that are utilized to illuminate the eyes of a user for eye tracking. The sensor can detect the presence of a prescription lens insert that covers and reflects/guides back a portion of the IR light from one or more of the IR LEDs used for eye tracking. The amount of light reflected/guided back to one or more of the photodiodes, from the underside of the prescription lens insert frame, which is placed on top of the VR HMD lens, signals a code that indicates the presence of the prescription lens insert.

The detected code can simply be an on/off signal to indicate to the VR HMD system's rendering the presence of view altering prescription inserts. The specifications (Spherical Power SPH, Cylindrical Power CYL and Axis AXS at least) of the user's prescription can be entered into the HMD system using a UI prior and the adoption of those settings to the rendering and distortion correction of the HMD optics can be determined based on the on/off code detected from the presence of the prescription insert.

With the specifications of the user's prescription, the VR rendering FOV can be adjusted to account for magnification or minification caused by the prescription lens insert, as well as adjust the HMD optics distortion correction accordingly to not introduce additional pupil swim.

Therefore, present principles enable a user and an HMD system to correctly render visuals even with the addition of prescription lens inserts.

Eye tracking IR cameras or sensors in some embodiments are placed in the frame around the HMD optics, along with the IR LEDs. For example, they are placed near the nose side. In this setup, the add-on prescription lens inserts reflect some of the IR LED in a very short distance into one of the edges of image frame captured from the IR eye tracking camera. The vision correction prescription parameters are encoded onto a reflective sticker on the inside of the prescription lens inserts, such that the reflected pattern appears as either a sharp pixelated pattern in the IR eye tracking camera image or as a series of blurry blobs. To enable the sharp pattern case, the reflective pattern may be covered with a stick-on Fresnel lens or micro lens array to focus the pattern reflection onto the IR eye tracking sensor.

By using such an approach, no additional hardware cost and complexity is added to the HMD system that uses eye tracking sensors on the outside of the HMD optics. Some minimal additional software cost is required to process the edge of the eye tracking camera imagers to detect and decode the vision correction specification from the prescription lens inserts While the particular embodiments are herein shown and described in detail, it is to be understood that the subject matter which is encompassed by the present invention is limited only by the claims.

What is claimed is:

1. An apparatus comprising:
   at least one processor configured to:
   receive signals from at least one light sensor in a head-mounted device (HMD) representing glints reflected from an eye of a person wearing the HMD; and
   based at least in part on the signals, output an indication that a prescription lens holder is disposed in the HMD.

2. The apparatus of claim 1, wherein the processor is configured to output the indication based at least in part on an absence of at least one glint.

3. The apparatus of claim 1, wherein the processor is configured to output the indication based at least in part on a modification of at least one glint from a baseline appearance.

4. The apparatus of claim 3, wherein the modification comprises a shape that is different from a shape of the baseline appearance.

5. The apparatus of claim 3, wherein the modification comprises a size that is different from a size of the baseline appearance.

6. The apparatus of claim 3, wherein the modification comprises a computer readable code.

7. The apparatus of claim 1, wherein the indication comprises presenting a user interface (UI) to prompt entry of prescription information.

8. The apparatus of claim 1, wherein the indication comprises providing prescription information obtained from the signals to a display engine to alter presentation of video on the HMD according to the prescription information.

9. An apparatus comprising:
   at least one prescription lens; and
   at least one holder comprising an inner periphery for holding the lens and, extending from the inner periphery, a lip configured to engage a lens of a head mounted display (HMD), wherein the holder comprises plural holes for allowing light from respective light sources to pass through the holder to an eye of a wearer of the HMD.

10. The apparatus of claim 9, wherein the HMD comprises N eye tracking light sources and the plural holes number no more than N−1.

11. The apparatus of claim 9, wherein the HMD comprises N eye tracking light sources and the plural holes number N, at least a first one of the plural holes being sized differently than at least a second one of the plural holes.

12. The apparatus of claim 9, wherein the HMD comprises N eye tracking light sources and the plural holes number N, at least a first one of the plural holes being shaped differently than at least a second one of the plural holes.

13. The apparatus of claim 9, comprising at least one object disposed in at least one of the plural holes and configured to produce a machine-readable code.

14. An apparatus comprising:
   at least one prescription lens; and
   at least one holder comprising an inner periphery for holding the lens and, extending from the inner periphery, a lip configured to engage a lens of a head mounted display (HMD), wherein the holder comprises at least one substrate configured to produce at least one machine readable code.

15. A method comprising:
   illuminating from a head-mounted device (HMD) to cause at least one eye of a wearer of the HMD to reflect light as glints; and
   modifying at least one glint to detect a prescription lens insert attachment on the HMD.

16. The method of claim 15, wherein the modifying comprises blocking light from at least one light source using the insert.

17. The method of claim 15, wherein the modifying comprises altering light from at least one light source using at least one optical device in the insert.

18. The method of claim 15, comprising:
   detecting a user identification code (UIC) based on a physical setting on the prescription lens insert;
   using the UIC, identifying at least one prescription parameter; and
   using the at least one prescription parameter, changing at least one virtual reality rendering and/or optical distortion correction in the HMD.

19. The method of claim 15, comprising detecting a computer readable code on the insert that represents at least one prescription parameter, the computer readable code being on a substrate engaged with the insert.

* * * * *